(12) United States Patent
Ollila

(10) Patent No.: US 12,289,538 B2
(45) Date of Patent: Apr. 29, 2025

(54) ERROR COMPENSATION IN IMAGES CAPTURED USING METALENSES

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 241 days.

(21) Appl. No.: 18/306,323

(22) Filed: Apr. 25, 2023

(65) Prior Publication Data

US 2024/0365011 A1  Oct. 31, 2024

(51) Int. Cl.
| | | |
|---|---|---|
| H04N 23/81 | (2023.01) |
| G01S 17/894 | (2020.01) |
| G06T 7/521 | (2017.01) |
| G06T 7/55 | (2017.01) |
| H04N 23/74 | (2023.01) |
| H04N 23/76 | (2023.01) |
| G02B 1/00 | (2006.01) |

(52) U.S. Cl.
CPC .......... *H04N 23/81* (2023.01); *G01S 17/894* (2020.01); *G06T 7/521* (2017.01); *G06T 7/55* (2017.01); *H04N 23/74* (2023.01); *H04N 23/76* (2023.01); *G02B 1/002* (2013.01); *G06T 2207/10028* (2013.01); *G06T 2207/20224* (2013.01)

(58) Field of Classification Search
CPC .............. G01S 17/894; G02B 1/002; G06T 2207/10028; G06T 2207/20224; G06T 7/521; G06T 7/55; H04N 23/74; H04N 23/76; H04N 23/81
See application file for complete search history.

(56) References Cited

U.S. PATENT DOCUMENTS

| | | | | |
|---|---|---|---|---|
| 10,437,012 | B1* | 10/2019 | Gurin | G02F 1/15 |
| 11,578,968 | B1* | 2/2023 | Capasso | G06T 7/55 |
| 11,995,842 | B2* | 5/2024 | Ma | G06T 7/174 |
| 2019/0361222 | A1* | 11/2019 | Gurin | G03B 17/00 |
| 2021/0080637 | A1* | 3/2021 | Brick | G02B 27/0172 |
| 2021/0325541 | A1* | 10/2021 | Kim | G06V 20/64 |
| 2021/0389599 | A1* | 12/2021 | Wang | G02B 27/0081 |
| 2023/0080390 | A1* | 3/2023 | Gurin | G02B 3/08 |
| | | | | 348/344 |
| 2024/0077655 | A1* | 3/2024 | Qiu | G02B 17/086 |

\* cited by examiner

*Primary Examiner* — Peter D Le
(74) *Attorney, Agent, or Firm* — Ziegler IP Law Group, LLC.

(57) ABSTRACT

Disclosed is imaging system (200) including controllable light source; image sensor; metalens to focus light onto IS; and processor(s). The processor(s) is configured to control CLS to illuminate given part of field of view of IS at a first instant, while controlling IS to capture first image (FImg). The image segment(s) represent a given part as illuminated and remaining image segment(s) represent a remaining part of the FOV as non-illuminated. The processor controls the CLS to illuminate the remaining part at second instant, while controlling IS to capture a second image whose image segment(s) represents a given part as non-illuminated and a remaining image segment(s) represents a remaining part as illuminated. Output image is generated based on: (i) image segment(s) of FImg and remaining image segment(s) of SImg, and/or (ii) remaining image segment(s) of FImg and image segment(s) of SImg.

22 Claims, 6 Drawing Sheets

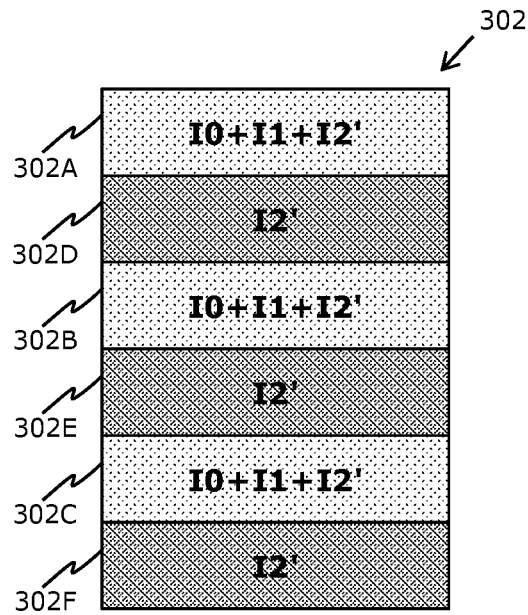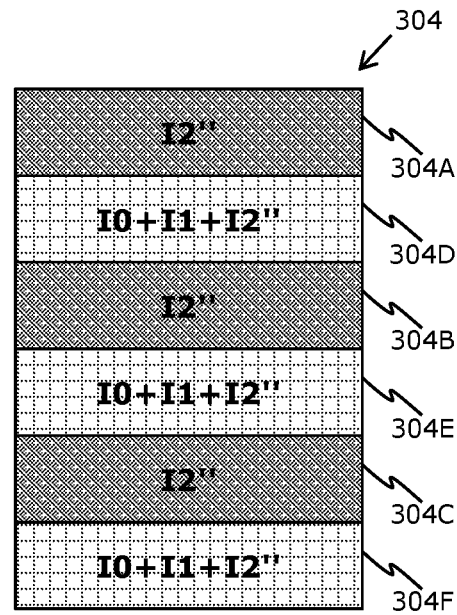
FIG. 3A  FIG. 3B
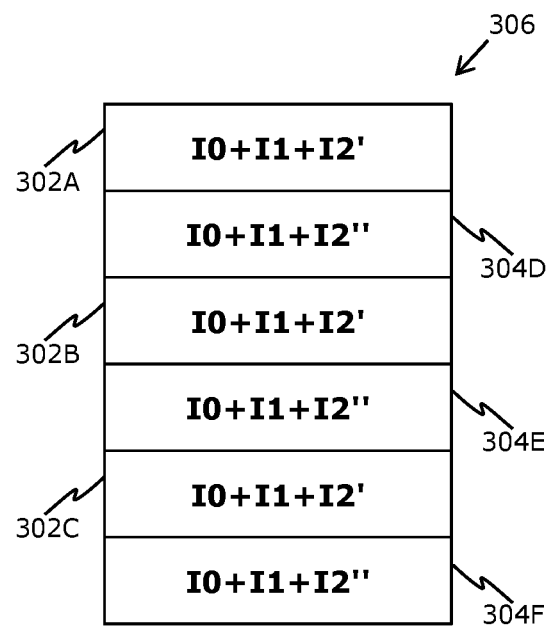
FIG. 3C

ERROR COMPENSATION IN IMAGES CAPTURED USING METALENSES

TECHNICAL FIELD

The present disclosure relates to imaging systems incorporating error compensation in images captured using metalenses. Moreover, the present disclosure relates to methods for imaging incorporating error compensation in images captured using metalenses.

BACKGROUND

Presently, metalenses are counted amongst top emerging technologies. These metalenses employ metasurfaces having nanostructures to focus light. Typically, the nanostructures are smaller than a wavelength of the light that is to be focused. Metalenses have flat surfaces and a thin design, thereby allowing for their use in a variety of optical systems. Metalenses enable miniaturization and simplification of optics. Currently, metalenses are suitable for focusing monochromatic light (i.e., narrowband light).

FIG. 1 (Prior Art) is a ray diagram illustrating how a metalens focuses light onto an image sensor. Referring to FIG. 1 (Prior Art), a ray diagram illustrates how a metalens 102 focuses light onto an image sensor (not shown). An object 104 from which the light is directed towards the metalens 102, is shown to be arranged at a distance S1 from the metalens 102. A plane 106 of the image sensor is shown, for sake of simplicity. The image sensor is arranged at a distance S2 from the metalens 102, at a side that is opposite to a side at which the object 104 is placed with respect to the metalens 102. An optical axis of the metalens 102 is shown as a dashed line O-O'.

A first order focal length f of the metalens 102 focuses the light correctly on the plane 106 of the image sensor and thus enables formation of a real image 108 (shown as a solid arrow) of the object 104 at the image sensor. A 2nd order parasitic focal length f(2nd) of the metalens 102 focuses the light at another plane 110 that lies between the metalens 102 and the plane 106 of the image sensor, thereby forming a real image 112 of the object 104 at the another plane 110. In other words, the 2nd order parasitic focal length f(2nd) focuses the light before the plane 106 of the image sensor. The another plane 110 lies at a distance S2(2nd) from the metalens 102 (and at a distance S2-S2(2nd) from the plane 106 of the image sensor). Due to the 2nd order parasitic focal length f(2nd), the light (that was focused at the another plane 110), upon reaching the plane 106, does not create any focused image of the object 104 anymore, but in fact produces unfocused light 114 (shown as a square-dot arrow) whose intensity spreads from a centre of the image sensor towards a corner of the image sensor. Moreover, some part of the light from the object 104 may not even reach the image sensor.

Therefore, it is clear from FIG. 1 that metalenses have some focusing problems associated therewith. From amongst an entirety of light that is incident upon the metalenses, 0th order light passes through the metalenses without refraction, 1st order light is properly focused sharply (as required) by the metalenses on image sensor planes, and 2nd order light results into unfocused light on the image sensor planes. As an example, from the entirety of light that is incident upon the metalenses, approximately 2.5 percent of the light is the 0th order light, approximately 2.5 percent of the light is the 2nd order light, and approximately 95 percent of the light is the 1st order light. In images captured using imaging systems where image sensors are arranged along focal planes of metalenses, the 2nd order light appears as a bright spot, which is an undesirable visual artifact. This bright spot is typically at a centre of the image sensors, and its intensity may reduce on going from the centre towards edges of the image sensors. As an example, tens of percent of total incoming light may be captured as the bright spot of the 2nd order light. Moreover, some parts of the 2nd order light may not even be captured in such images since the 2nd order light may spread beyond the image sensors. Therefore, the images captured using the metalenses have poor quality.

Therefore, in the light of the foregoing discussion, there exists a need to overcome the aforementioned drawbacks.

SUMMARY

The aim of the present disclosure is to provide an imaging system and a method for imaging that compensate for focusing problems of metalenses. The aim of the present disclosure is achieved by an imaging system and a method for imaging that incorporate error compensation in images captured using metalenses as defined in the appended independent claims to which reference is made to. Advantageous features are set out in the appended dependent claims.

Embodiments of the present disclosure substantially eliminate or at least partially address the aforementioned problems in the prior art, and enable generation of high-quality output images having error compensation for visual artifacts generated due to second order light from metalenses, thereby enabling use of such metalenses in a variety of imaging systems.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIGS. 3A and 3B are exemplary illustrations of a first image and a second image, in accordance with an embodiment of the present disclosure;

FIG. 3C is an exemplary illustration of an output image that is generated using the first image and the second image of FIG. 3A and FIG. 3B, respectively, in accordance with an embodiment of the present disclosure;

FIG. 3E is an exemplary illustration of a third image, while FIG. 3F is an exemplary illustration of an output image that is generated using the third image of FIG. 3E and the first image and the second image of FIG. 3A and FIG.

Figure 4A:
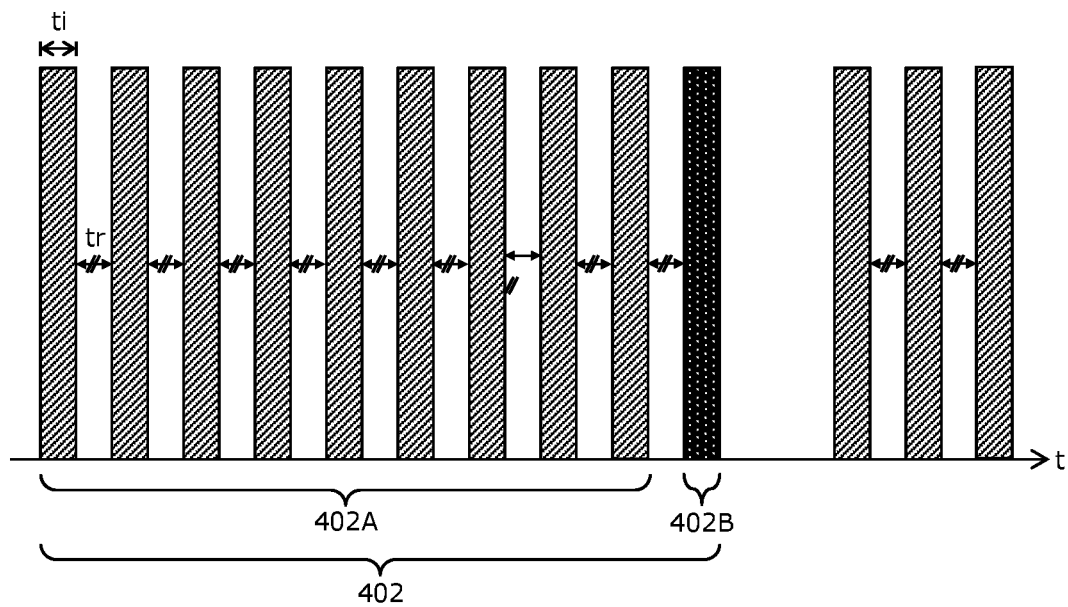
Figure 4B:
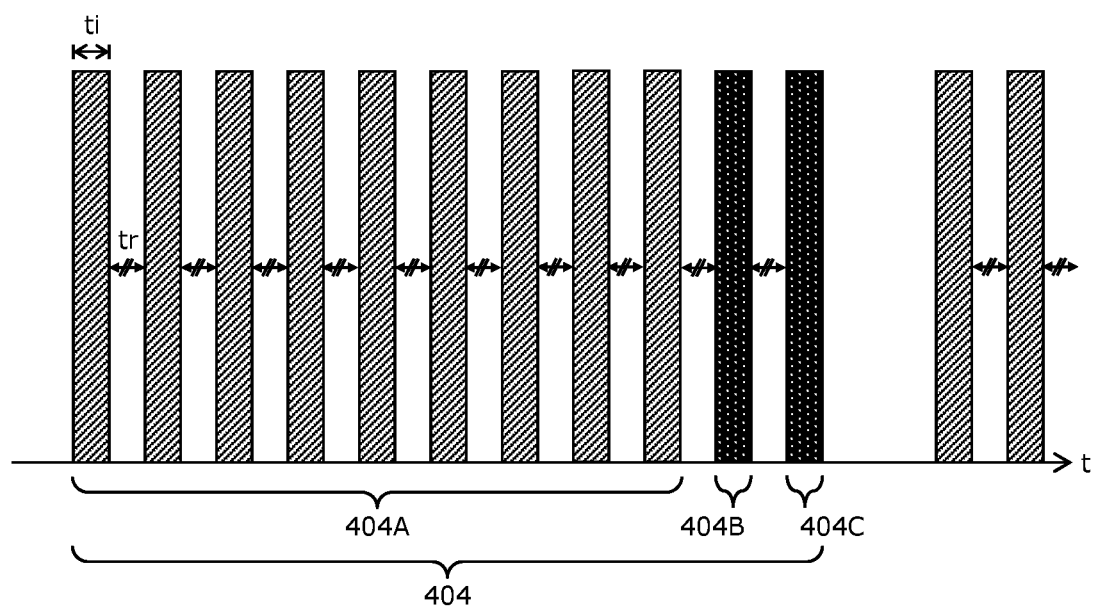
Figure 5A:
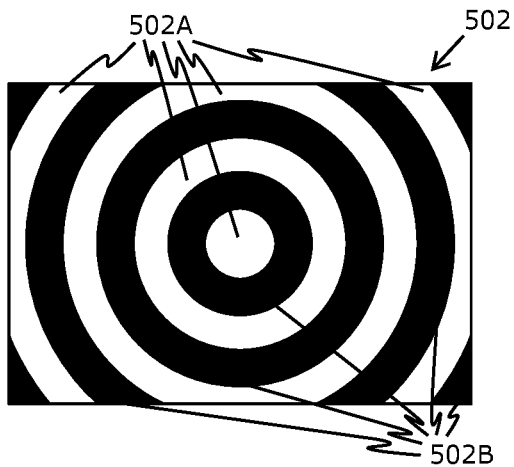
Figure 5B:
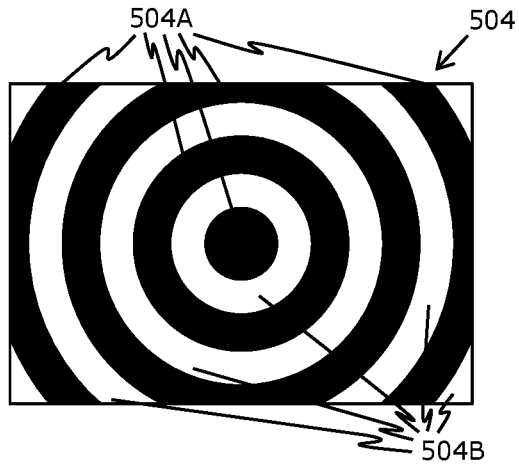
Figure 6A:
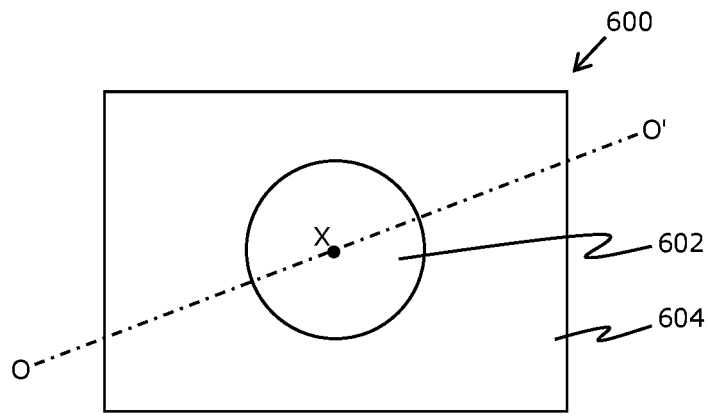
Figure 6B:
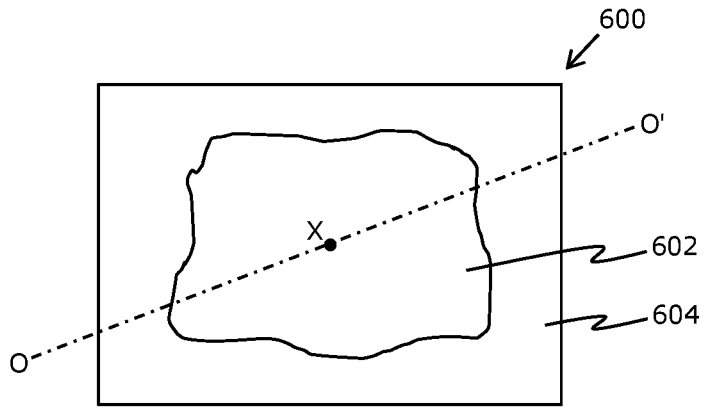
Figure 7:
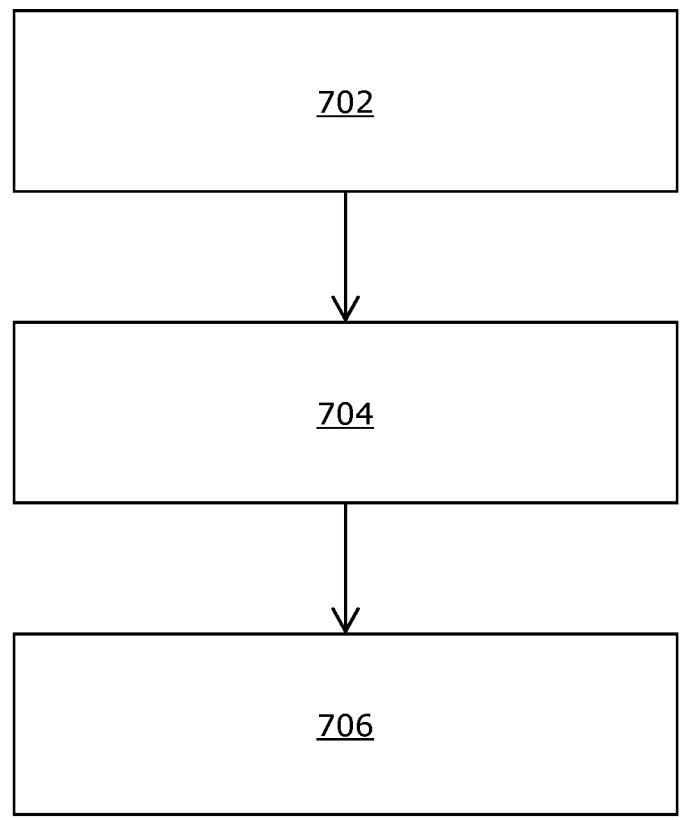

3B, respectively, in accordance with yet another embodiment of the present disclosure;

FIGS. 4A and 4B illustrate a timeline of capturing a sequence of images by an image sensor, in accordance with different embodiments of the present disclosure;

FIGS. 5A and 5B are exemplary illustrations of a first image and a second image having image segments in a form of concentric rings, respectively, in accordance with an embodiment of the present disclosure;

FIGS. 6A and 6B are exemplary illustrations of a given image comprising a first image segment and a second image segment, in accordance with different embodiments of the present disclosure; and FIG. 7 illustrates steps of a method for imaging incorporating error compensation in images captured using metalenses, in accordance with an embodiment of the present disclosure.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides an imaging system comprising:
 a controllable light source;
 an image sensor;
 a metalens that is to be employed to focus incoming light onto the image sensor; and
 at least one processor configured to:
  control the controllable light source to illuminate a given part of a field of view of the image sensor at a first time instant, whilst controlling the image sensor to capture a first image, wherein at least one image segment of the first image represents the given part of the field of view as being illuminated, and at least one remaining image segment of the first image represents a remaining part of the field of view as being non-illuminated;
  control the controllable light source to illuminate the remaining part of the field of view of the image sensor at a second time instant, whilst controlling the image sensor to capture a second image, wherein at least one image segment of the second image represents the given part of the field of view as being non-illuminated, and at least one remaining image segment of the second image represents the remaining part of the field of view as being illuminated; and
  generate an output image based on at least one of:
   (i) the at least one image segment of the first image and the at least one remaining image segment of the second image,
   (ii) the at least one remaining image segment of the first image and the at least one image segment of the second image.

In a second aspect, the present disclosure provides a method for imaging, the method being implemented by an imaging system comprising a controllable light source, an image sensor, and a metalens that is to be employed to focus incoming light onto the image sensor, the method comprising:
 controlling the controllable light source to illuminate a given part of a field of view of the image sensor at a first time instant, whilst controlling the image sensor to capture a first image, wherein at least one image segment of the first image represents the given part of the field of view as being illuminated, and at least one remaining image segment of the first image represents a remaining part of the field of view as being non-illuminated;
 controlling the controllable light source to illuminate the remaining part of the field of view of the image sensor at a second time instant, whilst controlling the image sensor to capture a second image, wherein at least one image segment of the second image represents the given part of the field of view as being non-illuminated, and at least one remaining image segment of the second image represents the remaining part of the field of view as being illuminated; and generating an output image based on at least one of:
  (i) the at least one image segment of the first image and the at least one remaining image segment of the second image,
  (ii) the at least one remaining image segment of the first image and the at least one image segment of the second image.

The present disclosure provides the aforementioned imaging system and the aforementioned method for imaging incorporating error compensation in images captured using metalenses. The imaging system employs the metalens for achieving benefits such as simple and compact optics, and cost-efficiency, whilst also effectively compensating for a visual artifact generated at the image sensor by the metalens due to 2nd order light. By partially illuminating the field of view of the image sensor when capturing the first image and the second image, not only an amount of the 2nd order light in the first image and the second image is reduced, but also positions at which the 2nd order light is formed is controlled in a complementary manner. The output image can be generated using various combinations of image segments in the first image and the second image, such that the output image has nil or minimal 2nd order light. As a result, the output image is sharp, clear, artifact-compensated, and has a high quality. Such an output image is beneficially usable for various applications (for example, such as extended-reality applications) involving high-quality images. Beneficially, due to such effective error compensation of focusing inefficiencies of metalenses, the metalenses can now advantageously be used in current and upcoming cameras (for example, such as in time-of-flight (TOF) cameras). The method described herein is simple, effective, reliable, and easy to implement.

The term "imaging system" refers to a system for imaging a real-world environment. The imaging system may be used for imaging real-world environments for a variety of applications including but not limited to extended-reality (XR), inspection of the real-world environment, machine vision, gaming, art, and so forth. Notably, the imaging system is a specialized equipment for generating output images. It will be appreciated that the imaging system generates the output images in real time or near-real time. Then, the output images are optionally communicated from the imaging system to at least one display apparatus. The output images are optionally to be presented to a user of the at least one display apparatus.

The "display apparatus" is a specialized equipment that is capable of at least displaying the output images. Optionally, the display apparatus is implemented as a head-mounted display (HMD). The term "head-mounted display" refers to specialized equipment that is configured to present an XR environment to the user when said HMD, in operation, is worn by the user on his/her head. The HMD is implemented, for example, as an XR headset, a pair of XR glasses, and the like, that is operable to display a visual scene of the XR environment to the user. Optionally, in this regard, the output images are XR images. The term "extended-reality" encompasses virtual reality (VR), augmented reality (AR), mixed reality (MR), and the like.

In some implementations, the imaging system is integrated with the display apparatus. In such implementations, the imaging system is physically coupled to the display apparatus (for example, attached via mechanical and/or electrical connections to components of the display apparatus). For example, at least one controllable light source and at least one image sensor per eye may be arranged on an outer surface of the display apparatus that faces the real-world environment. Optionally, in such implementations, the at least one processor of the imaging system serves as at least one processor of the display apparatus. Alternatively, optionally, in such implementations, the at least one processor of the imaging system is communicably coupled to at least one processor of the display apparatus.

In other implementations, the imaging system is implemented on a remote device that is separate from the display apparatus. In such implementations, the at least one processor of the imaging system and at least one processor of the display apparatus are optionally communicably coupled, wirelessly and/or in a wired manner. Optionally, the imaging system is mounted on the remote device. Examples of the remote device include, but are not limited to, a drone, a vehicle, a robot, and a teleport device. Optionally, the remote device is physically positioned at the real-world environment, whereas the user of the display apparatus is positioned away from (for example, at a distance from or at a different geographical location than) the remote device.

Throughout the present disclosure, the term "controllable light source" refers to an element from which light emanates. The controllable light source is controllable (for example, using electrical signals) to selectively illuminate the field of view of the image sensor. In other words, the controllable light source supports selective exposure of a region of interest (ROI) in the field of view of the image sensor. Optionally, the controllable light source emits light in at least one of: an infrared spectrum, a visible-light spectrum. A technical benefit of employing a controllable light source that emits light in the infrared (IR) spectrum is that such light is imperceptible to the user, has a long range which is useful for distance measurement using the imaging system, and is less affected by ambient light (as compared to light in the visible-light spectrum). Optionally, the controllable light source emits narrow-band light. As an example, the controllable light source may emit light in a narrow band of 10 nanometre (nm), which is suitable for use with a time-of-flight (TOF) camera. It will be appreciated that the controllable light source is arranged in the imaging system in a manner that it is capable of illuminating an entirety of the field of view of the image sensor.

Optionally, the controllable light source comprises at least one light-emitting element, the at least one light-emitting element comprises at least one of: a light-emitting diode (LED), a laser diode, a projector, a flash lamp, a pulsed incandescent light source. In an example, Vertical cavity surface emitting laser (VCSEL) diodes may be employed in the imaging system. The VCSEL diodes may be top-emitting VCSEL diodes. Optionally, the controllable light source further comprises a light-steering element that is configured to steer the light emitted by the at least one light-emitting element across the field of view or its part. Optionally, in this regard, the light-steering element is implemented as at least one of: a controllable scanning mirror, an actuator, light-steering optics. Examples of the mirror include, but are not limited to, a micro-electro-mechanical systems (MEMS) mirror, and a micro-opto-electro-mechanical systems (MO-EMS) mirror.

Throughout the present disclosure, the term "image sensor" refers to a device which detects light from the real-world environment at its photo-sensitive surface, when said light is incident thereupon. Optionally, the image sensor comprises a plurality of photo-sensitive elements, which collectively form the photo-sensitive surface of the image sensor. Upon such detection of the light from the real-world environment, the plurality of photo-sensitive elements capture a plurality of image signals. The plurality of image signals are electrical signals pertaining to a real-world scene of the real-world environment. The plurality of image signals are processed (by an image signal processor or the at least one processor of the imaging apparatus) to generate a digital image. A given photo-sensitive element is known as a picture element, or a pixel. It will be appreciated that the plurality of photo-sensitive elements could be arranged in various ways (for example, such as a rectangular two-dimensional (2D) grid, a polygonal arrangement, a circular arrangement, an elliptical arrangement, a freeform arrangement, or the like) to form the photo-sensitive surface of the image sensor. Examples of the image sensor include, but are not limited to, a charge-coupled device (CCD) image sensor, and a complementary metal-oxide-semiconductor (CMOS) image sensor.

Optionally, the image sensor comprises 1-tap pixels that read out the plurality of image signals in a single step. Beneficially, the 1-tap pixels are simpler and inexpensive. Alternatively, optionally, the image sensor comprises multi-tap pixels that read out the plurality of image signals in multiple steps. Beneficially, each step captures a portion of the plurality of image signals, allowing for a very accurate representation of a full dynamic range of images. Multi-tap pixels beneficially offer high image quality and superior performance in low-light conditions.

Throughout the present disclosure, the term "field of view" of the image sensor refers to an observable extent of the real-world environment that can be captured by the image sensor. The field of view of the image sensor is expressed in terms of degrees or radians. The field of view of the image sensor may depend on the size of the image sensor. Optionally, the field of view of the image sensor is greater than 50 degrees. As an example, the field of view of the image sensor may be 50, 60, 70, 80, 90, 100, 110, 120, 130, 140, 150, 160, 170, 180, 190, 200, 210, 220 degrees, and so forth. It will be appreciated that since the metalens is flat, a maximum angle at which it receives the incoming light is typically less than 180 degrees. However, with additional optical elements arranged on top of the metalens (i.e., on and/or in proximity of a metasurface of the metalens), the metalens could receive the incoming light from larger angles (namely, larger than 180 degrees).

Optionally, the controllable light source, the image sensor and the metalens constitute a metalens-based time-of-flight (TOF) camera. Optionally, in this regard, the metalens-based TOF camera further comprises a timing circuit configured to measure a time taken for light to travel from a light source of the metalens-based TOF camera to objects or their portions in the real-world environment and back from the objects or their portions to the image sensor, wherein the at least one processor is further configured to determine optical depths of the objects or their portions from the metalens-based TOF camera, based on said time. As an example, the metalens-based TOF camera may include a two-zone interleaved array of light-emitting elements in the controllable light source that enables the metalens-based TOF camera efficiently operate at two power levels using a single chip (i.e., a single image sensor) and same optical elements. In another example, the controllable light source may have 8 zones having 16 light-emitting elements (i.e., emitters) per zone, an emitter pitch in two dimensions being 56 micrometres (μm)×48 μm. Such a controllable light source may have applications in indirect TOF (iTOF) three-dimensional (3D) sensing, direct TOF (dTOF) 3D sensing, near-infrared (NIR) illumination, and the like. Optionally, the imaging system is implemented as the metalens-based TOF camera.

Optionally, the imaging system further comprises a light filter arranged with respect to the image sensor in a manner that the light incident upon the image sensor passes through the light filter and is then detected at the photo-sensitive surface of the image sensor. In an embodiment, the light filter is implemented as an IR and/or NIR wavelength filter. The IR and/or NIR wavelength filter can be tuned to filter different IR and/or NIR wavelengths, for example, such as 850 nm, 905 nm, 940 nm, 1060 nm, and similar, which can be understood to be distinct light bands of a non-visible light spectrum. In another embodiment, the light filter is implemented as a colour filter array (CFA). Optionally, the CFA is a Bayer CFA. As an example, the Bayer CFA could be one of: a 4C Bayer CFA, a 9C Bayer CFA, a 16C Bayer CFA. It will be appreciated that the CFA could alternatively be other than the Bayer CFA.

Throughout the present disclosure, the term "metalens" refers to an optical element that uses a metasurface to focus the incoming light, the metasurface being a surface having nanostructures (i.e., sub-wavelength structures) thereon. These nanostructures work as optical antennas and manipulate the incoming light at nanoscale, by capturing and directing the incoming light in a way that is similar to how metal antennas work with radio waves. The nanostructures may be arranged in the form of an array (for example, a quasiperiodic array). Typically, the nanostructures are smaller than a wavelength of the light that is to be focused. Optionally, the metasurface is a flat surface. Optionally, the metalens has telecentric optics. The metalens is made of materials comprising at least one of: metals, dielectrics. Optionally, the metalens is one of: a plasmonic metalens, a dielectric metalens. It will be appreciated that the metalens is beneficially much thinner and lighter than traditional lenses, thereby enabling simple and cost-effective lens designs.

Optionally, in the imaging system, the image sensor and the metalens are arranged along an axis in a manner that the axis passes through an optical centre of the image sensor and through an optical centre of the metalens. In other words, the image sensor and the metalens are aligned optical-centrally with each other. The aforesaid axis may be considered as an optical axis of the imaging system.

Optionally, when the image sensor is symmetrical with respect to its optical axis, the optical centre of the image sensor corresponds to a centre of the image sensor. Similarly, optionally, when the metalens is symmetrical with respect to its optical axis, the optical centre of the metalens corresponds to a centre of the metalens. It will be appreciated that alternatively, the optical centre of the image sensor and/or the metalens may not correspond to the centre of the image sensor and/or the metalens, respectively.

The at least one processor is coupled to the controllable light source and the image sensor. The at least one processor is implemented as hardware, software, firmware, or a combination of these. The at least one processor controls operation of the controllable light source and the image sensor, and also processes the plurality of image signals captured by corresponding pixels of the image sensor to generate images (i.e., the first image, the second image, and similar).

Optionally, the first image and the second image are at least one of: phase images, correlation images, depth images. A technical effect of this is that the imaging system can easily be employed as a metalens-based TOF camera that captures such a variety of images.

The term "phase image" refers to an image that is representative of a phase shift between a first light signal and a second light signal, wherein the first light signal is used to illuminate the field of view (either partially or fully) and the second light signal is a reflection of the first light signal from the real-world environment corresponding to the illuminated field of view, and wherein the second light signal is detected by the image sensor and processed to generate the phase images. Information indicative of this phase shift constitutes the phase images and is obtained by sampling a cross-correlation of the first light signal with the second light signal. A phase image does not directly indicate optical depths of the objects or their portions present in the real-world environment. Optionally, the first light signal is a modulated light signal.

The term "depth image" refers to an image which represents the optical depths of the objects or their portions present in the real-world environment. The depth image may also represent visual content of the real-world environment, in addition to the optical depths of the objects or their portions. Optionally, the depth image is a two-dimensional (2D) depth image or a 3D depth image. Optionally, the depth images are generated from phase images by processing the phase images using phase unwrapping.

The "correlation images" are intermediate images between the phase images and the depth images. In other words, the correlation images are generated while processing the phase images to generate the depth images, at an intermediate processing step. Optionally, the correlation images are generated using the phase images, wherein one correlation image is generated using two phase images. Furthermore, the correlation image may be an amplitude image, wherein the amplitude image represents correlation between two phase images.

Optionally, the at least one processor is configured to control the controllable light source at the first time instant using a first drive signal. In this regard, the first drive signal could selectively activate the controllable light source, selectively steer the light emitted by the controllable light source, or similar, to only illuminate the given part of the field of view of the image sensor and not the remaining part of the field of view. In the first image, both the given part and the remaining part of the field of view are represented, but it is clearly visible that the given part is deliberately illuminated for imaging while the remaining part is not-illuminated. This is so because the given part is represented in the first image by 0th order light that is not refracted by the metalens, 1st order light which is light that is properly focused by the metalens at the image sensor, and 2nd order light which is unfocused light received at the image sensor due to second order focusing properties of the metalens, whereas the remaining part is represented in the first image by 2nd order light only. An exemplary first image has been illustrated in conjunction with FIG. 3A, for the sake of clarity. It will be appreciated that an intensity of the 2nd order light may vary spatially across the image sensor in a manner that it decreases on going away from a centre of the image sensor towards edges of the image sensor. In other words, the intensity of the 2nd order light spreads from the centre of the image sensor to corners of the image sensor. The centre of the image sensor may be aligned with an optical axis of the metalens.

Throughout the present disclosure, the term "image segment" refers to a subset of pixels of an image. It will be appreciated that any image segment may be a continuous image segment (i.e. all pixels constituting the image segment are located together in the image) or a discontinuous image segment (i.e. pixels constituting the image segment are located disjointly in the image). It may be understood that the image segment may or may not have a defined shape and/or size. Moreover, it will be appreciated that the term "at least one image segment" refers to "one image segment" in some implementations and to "a plurality of image segments" in other implementations. Likewise, the term "at least one remaining image segment" refers to "one remaining image segment" in some implementations and to "a plurality of remaining image segments" in other implementations.

Optionally, the at least one image segment comprises a first image segment, and the at least one remaining image segment comprises a second image segment that surrounds the first image segment. Optionally, in this regard, the first image segment corresponds to a gaze-contingent portion of a given image, whereas the second image segment corresponds to a peripheral portion of the given image that surrounds the gaze-contingent portion. As an example, in the first image, the gaze-contingent portion may be illuminated while the peripheral portion is non-illuminated, whereas in the second image, the peripheral portion may be illuminated while the gaze-contingent portion is non-illuminated. In this example, the second image is complementary to the first image, meaning that image segment(s) that were not lighted up earlier when capturing the first image will be lighted up in the next image (i.e., the second image), and vice versa. The "given image" may be at least one of: the first image, the second image, the output image. Optionally, the at least one processor is communicably coupled to an eye-tracking means or a display apparatus comprising the eye-tracking means, wherein the eye-tracking means, in operation, generates sensor data indicative of a gaze direction of a user, and wherein the at least one processor determines the given part of the field of view of the image sensor and the remaining part of the field of view of the image sensor, based on the gaze direction of the user. In this case, the given part of the field of view is that part of the field of view which is contingent with the gaze direction of the user. Correspondingly, the at least one image segment and the at least one remaining image segment are determined based on the aforesaid different parts of the field of view. It will be appreciated that capturing images having the first image segment and the second image segment, emulates a manner in which human eyes view real-world environments, thereby leading to generation of realistic and immersive output images.

The term "eye-tracking means" refers to a specialized equipment for detecting and/or following the gaze of the user, when the display apparatus in operation is optionally worn by the user. The eye-tracking means could be implemented as contact lenses with sensors, cameras monitoring a position, a size and/or a shape of a pupil of a given eye of the user, and the like. Such eye-tracking means are well-known in the art. The eye-tracking means is configured to collect eye-tracking data, which constitutes the sensor data indicative of the gaze direction of the user; and send the eye-tracking data to the at least one processor of the imaging system. It will be appreciated that the eye-tracking data is collected repeatedly by the eye-tracking means throughout a given session of using the display apparatus, as gaze of the user's eyes keeps changing whilst he/she uses the display apparatus. An up-to-date eye-tracking data (indicative of the gaze direction of the user) allows for producing up-to-date output images at the imaging system. These output images are to be employed to produce XR images for displaying at the display apparatus.

Optionally, the first image segment is symmetric about an axis passing through an optical centre of the image sensor. The optical centre of the image sensor may or may not correspond to the (physical) centre of the image sensor. In this regard, the first image segment has a shape that is symmetric about the axis that passes through a point in the given image that corresponds to the optical centre of the image sensor. Herein, the shape of the first image segment exhibits rotational symmetry about the axis. In such a case, the shape of the first image segment may, for example, be a circle, an annulus shape, or the like. A technical benefit of this embodiment is that it enables in accurately distinguishing (unwanted) 2nd order light from the 0th order light and the 1st order light. This is so because light from objects in the field of view is bent in an approximately same ratio towards the optical centre of the image sensor (to form the first image segment about said point in the given image). In this regard, 2nd order parasitic focal length of the metalens also bends 2nd order light from such objects towards the optical centre of the image sensor and thus a position of the 2nd order light in the given image can be ascertained easily. Optionally, the first image segment is symmetric about a centre of the given image. In such a case, the shape of the first image segment may, for example, be an ellipse, a rectangle, a hexagon, a regular polygram (such as regular star shapes) or similar. The given image comprising such a first image segment has been illustrated in conjunction with FIG. 6A, for the sake of clarity.

Alternatively, optionally, the first image segment is not symmetric. In this regard, the first image segment has a shape that is non-symmetric. Herein, the shape of the first image segment neither exhibits rotational symmetry nor exhibits symmetry about the centre of the given image. In such a case, the shape of the first image segment may, for example, be an elliptical shape, an anamorphic shape, a freeform shape, or the like. The given image comprising such a first image segment has been illustrated in conjunction with FIG. 6B, for the sake of clarity. A technical effect of such an embodiment is seen in a case where the metalens is unsymmetric (i.e., the metalens has an unsymmetric arrangement of the nanostructures). In such a case, the shape of the first image segment follows rotational unsymmetry (and the unsymmetric shape) of the metalens, and a position of the 2nd order light in the given image can be accurately determined accordingly.

Optionally, the at least one image segment comprises a plurality of image segments, and the at least one remaining image segment comprises a plurality of remaining image segments, wherein the plurality of image segments and the plurality of remaining image segments are arranged in an interleaved manner. Notably, images having such image segments are captured when the controllable light source is controlled to illuminate the field of view of the image sensor in an alternating illumination pattern, and such images represent the alternating illumination pattern. This means that a plurality of portions of the field of view are illuminated in a manner that two or more portions from amongst the plurality of portions are illuminated, while two or more remaining portions from amongst the plurality of portions are not-illuminated, an arrangement of the two or more portions and the two or more remaining portions being interleaved with respect to each other. A technical effect of capturing images with such interleaved image segments is that the 2nd order light from the objects in the field of view falls on certain areas of these image segments and from illuminated image segments it is possible to accurately estimate the 2nd order light.

Optionally, the image sensor is a time-of-flight sensor, the output image being a phase image, the plurality of image segments and the plurality of remaining image segments being in a form of stripes, wherein the at least one processor is configured to:
  process a plurality of phase images to generate a depth map;
  process amplitude data in at least one of the plurality of phase images to generate an additional depth map; and
  employ the additional depth map for reducing error in the depth map generated from the plurality of phase images.

In this regard, when the plurality of image segments and the plurality of remaining image segments are arranged in the interleaved manner, they are in the form of structured light (having parallel stripes). This interleaved arrangement of image segments represents illuminated and non-illuminated portions of the field of view in an alternating manner, which is similar to an illumination pattern of structured light. The "depth map" is a data structure that is indicative of the optical depths of the objects in the field of view or of portions of such objects. The plurality of phase images can be processed using well-known image processing algorithms for generating the depth map. For example, 3, 4, 8 or 9 phase images may be processed to generate the depth map, in case of the ToF sensor. Moreover, the structured light enables in generation of the additional depth map. The processing of the amplitude data (for generation of the additional depth map) corresponds to how the structured light is analysed to generate the depth map. Such processing can be implemented using well-known image processing techniques. Typically, in the amplitude data, high amplitude values are indicative of strong reflected light signals, which in turn are indicative of close object distances from the time-of-flight sensor (i.e., less optical depth of the objects), and vice versa. The additional depth map serves as a useful reference for indicating whether the depth map includes any errors, and if any errors are present, optical depth values in the additional depth map enable in reducing those errors in the depth map. In other words, the optical depth values in the additional depth map can be used as a correction grid, which can be applied to optical depth values in the depth map. For reducing the errors in the depth map, an offset (indicated in the correction grid) is removed from each pixel in the depth map, said offset being proportional to a difference between a corresponding optical depth value in the depth map and a corresponding optical depth value in the additional depth map. Optionally, a maximum allowable error is set such that the errors are not over-compensated.

Optionally, the additional depth map is a sparse depth map. This means that the additional depth map has been sparsely sampled (i.e., it includes optical depth values of only few points in the FOV, while optical depth values of other points in the FOV may be missing or undefined). Optionally, in this regard, the sparse depth map is upscaled to match a spatial resolution of the depth map that is generated using the plurality of phase images. Such upscaling may be performed by using interpolation between neighbouring optical depth values in the sparse depth map, or using the depth map as a guide image for upscaling the sparse depth map by utilizing guided filtering, or similar upsampling techniques. In this upscaling process, an original spatial resolution of the sparse depth map is increased to match the spatial resolution of the depth map, and thus upon upscaling the additional depth map can be more accurately processed with the depth map generated using the plurality of phase images. Upsampling techniques based on filtering in spatial or spatio-temporal domain are often variants and extensions of a bilateral filter (for example, such as Joint Bilateral upsampling (JBU) upsampling filter, Joint Bilateral Median (JBM) upsampling filter, or similar).

Optionally, the plurality of image segments and the plurality of remaining image segments are in a form of concentric rings. Optionally, in this regard, a centre of the concentric rings coincides with a centre of the given image. The concentric rings are shaped as simple closed curves. Herein, the term "simple closed curve" refers to a connected curve that does not cross itself and ends at the same point where it begins. Examples of a simple closed curve include, but are not limited to, polygons, circles, ellipses, and free-form closed curves. Notably, despite use of the word "curve" in its name, a simple closed curve is not necessarily curved in shape. It will be appreciated that a simple closed curve is made up of line segments only, curved lines only, or a combination of line segments and curved lines. When the simple closed curve is made up of line segments only, the simple closed curve is a polygon (for example, such as a square, a rectangle, a hexagon, an octagon, and the like). When the simple closed curve is made up of curved lines only, the simple closed curve has a curved shape (for example, such as a circle, an ellipse, and the like). As an example, both the first image and the second image may include a total of eight concentric image segments, wherein four alternate image segments are illuminated in the first image and four other alternate remaining image segments are illuminated in the second image. An exemplary first image and an exemplary second image comprising multiple interleaved image segments in the form of concentric rings has been illustrated in conjunction with FIGS. 5A and 5B, for the sake of clarity.

Optionally, at least one of: a number, a shape, a size, a position, an orientation, of the at least one image segment and the at least one remaining image segment changes with time. As an example, the size of the at least one image segment and the at least one remaining image segment in a first set of the first image (captured at the first time instant) and the second image (captured at the second time instant) would be same, but their sizes may change for capturing subsequent sets of first images and second images at later time instants. For generating a sequence of output images, a plurality of such sets of the first images and the second images may be captured at different times. In this way, each output image of a sequence of output images is generated by reading different ROIs (in terms of at least one of: a number, a shape, a size, a position, an orientation, of image segments) at different times. Continuing from the above example, an angular width of the first image segment, which is indicative of the size of the first image segment, may change with time. In the first set of the first image and the second image, the angular width may be 45 degrees, in a second set of the first image and the second image, the angular width may be 30 degrees, in a third set of the first image and the second image, the angular width may be 15 degrees, and so on. The technical benefit of changing the at least one of: the number, the shape, the size, the position, the orientation, of the at least one image segment and the at least one remaining image segment is that the user is not able to perceive a boundary of these image segments in the output images generated therefrom.

Optionally, the at least one processor is configured to control the controllable light source at the second time instant using a second drive signal. In this regard, the second drive signal could selectively activate the controllable light source, selectively steer the light emitted by the controllable light source, or similar, to only illuminate the remaining part of the field of view of the image sensor and not the given part of the field of view. In the second image, both the given part and the remaining part of the field of view are represented, but it is clearly visible that the remaining part is deliberately illuminated for imaging while the given part is not-illuminated. This is so because the remaining part is represented in the second image by 0th order light that is not refracted by the metalens, 1st order light which is light that is properly focused by the metalens at the image sensor, and 2nd order light which is unfocused light received at the image sensor due to second order focusing properties of the metalens, whereas the given part is represented in the second image by 2nd order light only. An exemplary second image has been illustrated in conjunction with FIG. 3B, for the sake of clarity.

It will be appreciated that when capturing the given image (i.e., the first image and/or the second image), the field of view is illuminated only partially at a given time instant, and therefore, an amount of the 2nd order light in the given image would be reduced as compared to any image that is captured when the field of view is illuminated fully. For example, in the first image and the second image, the amount of the 2nd order light may be reduced to approximately half of its maximum feasible amount (in a fully-illuminated image). This would beneficially provide a better image quality of the output image as compared to the fully-illuminated image.

In some implementations, the output image is generated using those image segments of the first image and the second image that represent their corresponding parts of the field of view as being illuminated. In some other implementations, the output image is generated using those image segments of the first image and the second image that represent their corresponding parts of the field of view as being non-illuminated. In yet other implementations, the output image is generated using all image segments of the first image and the second image. These various manners of generating the output image are discussed in further detail below.

Optionally, the output image is generated by combining the at least one image segment of the first image and the at least one remaining image segment of the second image. In this regard, the output image is generated by taking image segments that represent different illuminated parts of the field of view in different images, and combining such image segments. In other words, the output image is generated using illuminated image segments (i.e., the at least one image segment of the first image and the at least one remaining image segment of the second image). Moreover, these illuminated image segments (of partially-illuminated images, namely the first image and the second image) have lower amounts of the 2nd order light as compared to image segments of fully-illuminated images. The output image so generated has high levels of desired illumination (i.e., the 1st order light) and low levels of undesired illumination (i.e., the 2nd order light). Such an exemplary output image has been illustrated in conjunction with FIG. 3C, for the sake of clarity.

Alternatively, optionally, when generating the output image, the at least one processor is configured to:
subtract pixel values of pixels in the at least one image segment of the second image from pixel values of corresponding pixels in the at least one image segment of the first image, to generate at least one image segment of the output image;
subtract pixel values of pixels in the at least one remaining image segment of the first image from pixel values of corresponding pixels in the at least one remaining image segment of the second image, to generate at least one remaining image segment of the output image; and
combine the at least one image segment of the output image with the at least one remaining image segment of the output image, to generate the output image.

In this regard, the output image is generated using all image segments of the first image and the second image. Notably, subtracting the pixel values of the pixels in the at least one image segment of the second image from the pixel values of the corresponding pixels in the at least one image segment of the first image fully cancels out or nearly cancels out an illumination of the 2nd order light in the pixels in the at least one image segment of the first image, thereby generating the at least one image segment of the output image beneficially having nil or very low (negligible) levels of the 2nd order light. Likewise, subtracting the pixel values of the pixels in the at least one remaining image segment of the first image from the pixel values of the corresponding pixels in the at least one remaining image segment of the second image, fully cancels out or nearly cancels out an illumination of the 2nd order light in the pixels in the at least one remaining image segment of the second image, thereby generating the at least one remaining image segment of the output image beneficially having nil or very low (negligible) levels of the 2nd order light. The output image generated by combining the at least one image segment of the output image with the at least one remaining image segment of the output image beneficially has high levels of desired illumination (i.e., the 1st order light) and nil or very low levels of undesired illumination (i.e., the 2nd order light). Such an exemplary output image has been illustrated in conjunction with FIG. 3D, for the sake of clarity Herein, the "pixel value" of a pixel refers to a value of the pixel, which encompasses at least one of: a colour value (i.e., an intensity value), a luminance value (for example, such as a hue value, a saturation value, and a lightness value), of the pixel. Optionally, the colour value is one of: a grayscale value, an RGB colour value, an RGB-A colour value, a Cyan-Magenta-Yellow-Black (CMYK) colour value, a high dynamic range (HDR) colour value.

Yet alternatively, optionally, when generating the output image, the at least one processor is configured to:
control the controllable light source to illuminate an entirety of the field of view of the image sensor at a third time instant, whilst controlling the image sensor to capture a third image;
subtract pixel values of pixels in the at least one image segment of the second image from pixel values of corresponding pixels in at least one image segment of the third image, to generate at least one image segment of the output image;
subtract pixel values of pixels in the at least one remaining image segment of the first image from pixel values of corresponding pixels in at least one remaining image segment of the third image, to generate at least one remaining image segment of the output image; and combine the at least one image segment of the output image with the at least one remaining image segment of the output image, to generate the output image.

In this regard, the output image is generated using a fully-illuminated image (such as the third image) and non-illuminated image segments (such as the at least one remaining image segment of the first image and the at least one image segment of the second image). The third image represents the entirety of the field of view as being illuminated. At the third time instant of capturing the third image, the entirety of the field of view is illuminated, and therefore, the maximum feasible amount of the 2nd order light is present in the third image. But the steps of subtracting the pixel values of the pixels in the at least one image segment of the second image from the pixel values of the corresponding pixels in at least one image segment of the third image, and subtracting the pixel values of the pixels in the at least one remaining image segment of the first image from the pixel values of the corresponding pixels in at least one remaining image segment of the third image enable in effectively reducing the 2nd order light when generating the image segments of the output image. As a result, the output image has high levels of the desired illumination (i.e., the 1st order light) and nil or very low levels of the undesired illumination (i.e., the 2nd order light). An exemplary third image and such an exemplary output image have been illustrated in conjunction with FIG. 3E and FIG. 3F, respectively, for the sake of clarity Furthermore, optionally, the at least one processor is configured to:

control the controllable light source to illuminate an entirety of the field of view of the image sensor at a plurality of time instants, whilst controlling the image sensor to capture a plurality of images;

subtract pixel values of pixels in the output image from pixel values of corresponding pixels in one of the plurality of images, to generate delta pixel values of the pixels; and subtract the delta pixel values of the pixels from pixel values of corresponding pixels in respective ones of the plurality of images, to generate corresponding output images.

Optionally, the at least one processor is further configured to change a pose of at least one of: the controllable light source, the image sensor, at the plurality of time instants of capturing the plurality of images. Herein, the term "pose" encompasses position and/or orientation. Notably, the plurality of images have each of the 0th order light, the 1st order light, and the 2nd order light. In other words, each image amongst the plurality of images is a fully-illuminated image. Any image from amongst the plurality of images may be selected for determining the delta pixel values of the pixels. The delta pixel values of the pixels are indicative of a difference in illumination between the output image (that has nil or very low levels of undesired illumination such as the 2nd order light) and the one of the plurality of images (that has high levels of the undesired illumination). When the corresponding output images are generated in the aforesaid manner, said difference is beneficially reduced, and thus a quality of the sequence of output images is improved.

Optionally, the plurality of images are at least one of: phase images, correlation images, depth images. In such a case, the corresponding output images are also one of: phase images, correlation images, depth images, respectively. Optionally, the at least one processor is further configured to process these output images to generate a depth map. When the plurality of images and their corresponding output images are the phase images, such processing may comprise unwrapping the phase images to remove any phase ambiguities, and comparing the unwrapped phase images to calculate phase difference therebetween, the phase difference being proportional to the optical depths of the objects or their portions present in the real-world environment. The depth map is indicative of the optical depths of the objects or their portions present in the real-world environment. The depth map may be generated when the imaging system operates in a Pulse Coded Modulation (PCM) mode. In an example, a set of nine phase images may be processed by the at least one processor for generating the depth map. In another example, a set of four phase images may be processed for generating the depth map.

The present disclosure also relates to the method as described above. Various embodiments and variants disclosed above, with respect to the aforementioned imaging system, apply mutatis mutandis to the method. Optionally, the step of generating the output image comprises combining the at least one image segment of the first image and the at least one remaining image segment of the second image.

Alternatively, optionally, the step of generating the output image comprises:

subtracting pixel values of pixels in the at least one image segment of the second image from pixel values of corresponding pixels in the at least one image segment of the first image, for generating at least one image segment of the output image;

subtracting pixel values of pixels in the at least one remaining image segment of the first image from pixel values of corresponding pixels in the at least one remaining image segment of the second image, for generating at least one remaining image segment of the output image; and combining the at least one image segment of the output image with the at least one remaining image segment of the output image, for generating the output image.

Yet alternatively, optionally, the step of generating the output image comprises:

controlling the controllable light source to illuminate an entirety of the field of view of the image sensor at a third time instant, whilst controlling the image sensor to capture a third image;

subtracting pixel values of pixels in the at least one image segment of the second image from pixel values of corresponding pixels in at least one image segment of the third image, for generating at least one image segment of the output image;

subtracting pixel values of pixels in the at least one remaining image segment of the first image from pixel values of corresponding pixels in at least one remaining image segment of the third image, for generating at least one remaining image segment of the output image; and combining the at least one image segment of the output image with the at least one remaining image segment of the output image, for generating the output image.

Moreover, optionally, the method further comprises:

controlling the controllable light source to illuminate an entirety of the field of view of the image sensor at a plurality of time instants, whilst controlling the image sensor to capture a plurality of images;

subtracting pixel values of pixels in the output image from pixel values of corresponding pixels in one of the plurality of images, for generating delta pixel values of the pixels; and subtracting the delta pixel values of the pixels from pixel values of corresponding pixels in respective ones of the plurality of images, for generating corresponding output images.

Optionally, in the method, the at least one image segment comprises a plurality of image segments, and the at least one remaining image segment comprises a plurality of remaining image segments, wherein the plurality of image segments and the plurality of remaining image segments are arranged in an interleaved manner.

Optionally, in the method, the image sensor is a time-of-flight sensor, the output image being a phase image, the plurality of image segments and the plurality of remaining image segments being in a form of stripes, wherein the method further comprises:

processing a plurality of phase images for generating a depth map;

processing amplitude data in at least one of the plurality of phase images for generating an additional depth map; and employing the additional depth map for reducing error in the depth map generated from the plurality of phase images.

Optionally, in the method, the plurality of image segments and the plurality of remaining image segments are in a form of concentric rings.

Optionally, in the method, the at least one image segment comprises a first image segment, and the at least one remaining image segment comprises a second image segment that surrounds the first image segment. Optionally, the first image segment is symmetric about an axis passing through an optical centre of the image sensor. Alternatively, optionally, the first image segment is not symmetric.

DETAILED DESCRIPTION OF THE DRAWINGS

Figure 1:
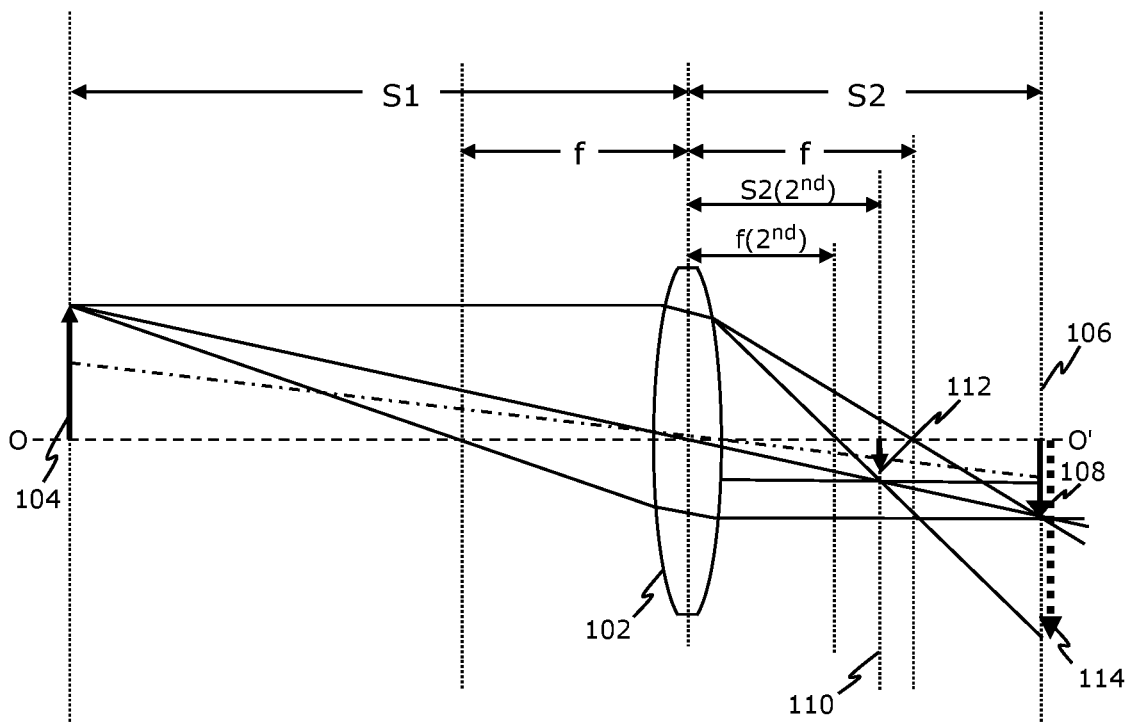
FIG. 1 (Prior Art) is a ray diagram illustrating how a metalens focuses light onto an image sensor.
Figure 2:
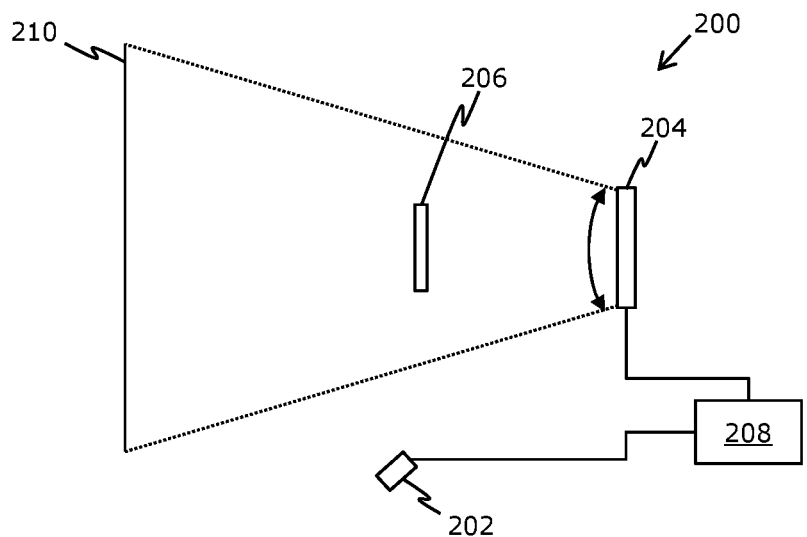
FIG. 2 is an illustration of an environment in which an imaging system is in use, in accordance with an embodiment of the present disclosure.

Referring to FIG. 2, illustrated is an environment in which an imaging system 200 is in use, in accordance with an embodiment of the present disclosure. The imaging system 200 comprises a controllable light source 202, an image sensor 204, a metalens 206 that is to be employed to focus incoming light onto the image sensor 204, and at least one processor (depicted as a processor 208). The processor 208 is coupled to the controllable light source 202 and the image sensor 204. The processor 208 is configured to control the controllable light source 202 to selectively illuminate different parts of a field of view 210 of the image sensor 204 at different time instants, while controlling the image sensor 204 to capture different images at the different time instants. Thereafter, the processor 208 is configured to generate an output image based on image segments in the different images.

Referring to FIGS. 3A and 3B, FIGS. 3A and 3B are exemplary illustrations of a first image 302 and a second image 304, in accordance with an embodiment of the present disclosure. In FIG. 3A, the first image 302 comprises at least one image segment (depicted as image segments 302A, 302B, and 302C) and at least one remaining image segment (depicted as remaining image segments 302D, 302E, and 302F). The image segments 302A-C represent a given part of a field of view of an image sensor (not shown) as being illuminated, and the remaining image segments 302D-F represent a remaining part of the field of view as being non-illuminated. The image segments 302A-C capture 0th order light I0 which is light that is not refracted by a metalens (not shown) arranged on an optical path of incoming light for the image sensor, 1st order light I1 which is light that is properly focused by the metalens at the image sensor, and 2nd order light I2' which is unfocused light received at the image sensor due to second order focusing properties of the metalens. The remaining image segments 302D-F capture only the 2nd order light I2'.

In FIG. 3B, the second image 304 comprises at least one image segment (depicted as image segments 304A, 304B, and 304C) and at least one remaining image segment (depicted as remaining image segments 304D, 304E, and 304F). The image segments 304A-C represent the given part of the field of view as being non-illuminated, and the remaining image segments 304D-F represent the remaining part of the field of view as being illuminated. The image segments 304A-C capture only 2nd order light I2" which is unfocused light received at the image sensor due to second order focusing properties of the metalens. The remaining image segments 304D-F capture 0th order light I0 which is light that is not refracted by the metalens, 1st order light I1 which is light that is properly focused by the metalens at the image sensor, and the 2nd order light I2".

In both FIGS. 3A and 3B, the at least one image segment comprises a plurality of image segments 302A-C and 304A-C, and the at least one remaining image segment comprises a plurality of remaining image segments 302D-F and 304D-F, wherein the plurality of image segments 302A-C and 304A-C and the plurality of remaining image segments 302D-F and 304D-F are arranged in an interleaved manner, respectively.

Referring to FIG. 3C, illustrated is an exemplary illustration of an output image 306 that is generated using the first image 302 and the second image 304 of FIG. 3A and FIG. 3B, respectively, in accordance with an embodiment of the present disclosure. The output image 306 is generated by combining the at least one image segment 302A-C of the first image 302 and the at least one remaining image segment 304D-F of the second image 304.

Figure 3D:
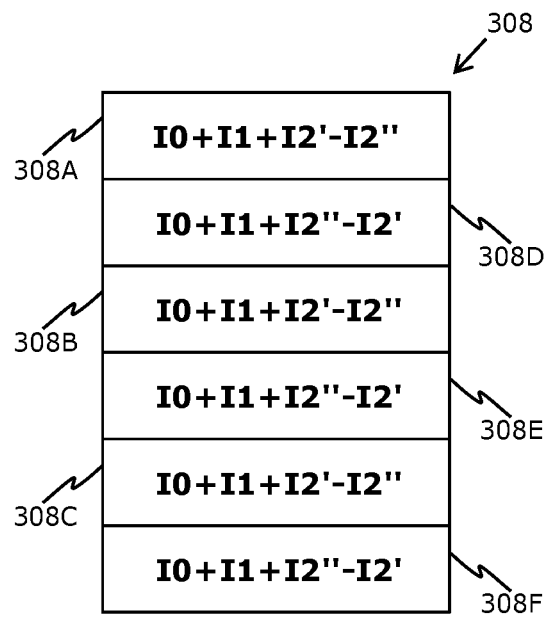
FIG. 3D is an exemplary illustration of an output image that is generated using the first image and the second image of FIG. 3A and FIG. 3B, respectively, in accordance with another embodiment of the present disclosure.

Referring to FIG. 3D, illustrated is an exemplary illustration of an output image 308 that is generated using the first image 302 and the second image 304 of FIG. 3A and FIG. 3B, respectively, in accordance with another embodiment of the present disclosure. The output image 308 is generated by: subtracting pixel values of pixels in the image segments 304A-C of the second image 304 from pixel values of corresponding pixels in the image segments 302A-C of the first image 302, to generate at least one image segment (depicted as image segments 308A, 308B, and 308C) of the output image 308; subtracting pixel values of pixels in the remaining image segments 302D-F of the first image 302 from pixel values of corresponding pixels in the remaining image segments 304D-F of the second image 304, to generate at least one remaining image segment (depicted as remaining image segments 308D, 308E, and 308F) of the output image 308; and combining the image segments 308A-C of the output image 308 with the remaining image segments 308D-F of the output image 308.

Figures 3E, 3F:
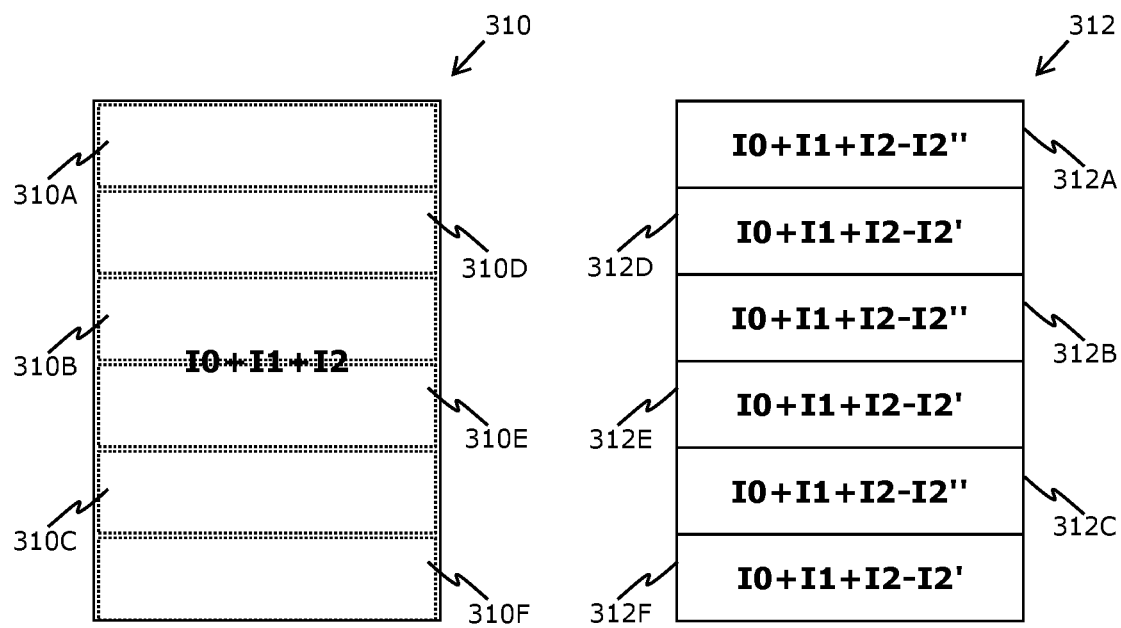

Referring to FIGS. 3E and 3F, FIG. 3E is an exemplary illustration of a third image 310, while FIG. 3F is an exemplary illustration of an output image 312 that is generated using the third image 310 of FIG. 3E and the first image 302 and the second image 304 of FIG. 3A and FIG. 3B, respectively, in accordance with yet another embodiment of the present disclosure. The third image 310 is captured when an entirety of the field of view of the image sensor is illuminated. Therefore, all image segments 310A-F of the third image 310 capture 0th order light I0 which is light that is not refracted by a metalens, 1st order light I1 which is light that is properly focused by the metalens at the image sensor, and the 2nd order light I2″. The output image 312 is generated by: subtracting pixel values of pixels in the image segments 304A-C of the second image 304 from pixel values of corresponding pixels in at least one image segment (depicted as image segments 310A, 310B, and 310C) of the third image 310, to generate at least one image segment (depicted as image segments 312A, 312B, and 312C) of the output image 312; subtracting pixel values of pixels in the remaining image segments 302D-F of the first image 302 from pixel values of corresponding pixels in at least one remaining image segment (depicted as remaining image segments 310D, 310E, and 310F) of the third image 310, to generate at least one remaining image segment (depicted as remaining image segments 312D, 312E, and 312F) of the output image 312; and combining the image segments 312A-C of the output image 312 with the remaining image segments 312D-F of the output image 312.

FIGS. 3A-3F are merely examples, which should not unduly limit the scope of the claims herein. A person skilled in the art will recognize many variations, alternatives, and modifications of embodiments of the present disclosure.

Referring to FIGS. 4A and 4B, illustrated is a timeline of capturing a sequence of images by an image sensor, in accordance with different embodiments of the present disclosure. In FIG. 4A, the sequence of images comprises a set 402 of 10 images (shown as 9 images 402A (depicted as slanted-hatched images) captured by fully illuminating a field of view of the image sensor (not shown) and as a single image 402B (depicted as a dark-dotted-hatched image) that is captured by selectively illuminating the field of view of the image sensor) and its next set of images (shown only partially). In FIG. 4B, the sequence of images comprises a set 404 of 11 images (shown as 9 images 404A (depicted as slanted-hatched images) captured by fully illuminating a field of view of the image sensor (not shown) and as two images 404B and 404C (depicted as dark-dotted-hatched images) that are captured by selectively illuminating the field of view of the image sensor) and its next set of images (shown only partially). An illumination pattern that is employed for capturing the image 404B is optionally different from an illumination pattern that is employed for capturing the image 404C. An integration time ti of each image in FIGS. 4A and 4B may be same, and may, for example, be 150 microseconds. A readout time tr of each image in FIGS. 4A and 4B may be same, and may, for example, be 1 microsecond. For example, FIGS. 4A and 4B illustrate an exposure scheme of a multi-tap pixel.

FIGS. 4A and 4B are merely examples, which should not unduly limit the scope of the claims herein. A person skilled in the art will recognize many variations, alternatives, and modifications of embodiments of the present disclosure.

Referring to FIGS. 5A and 5B, illustrated are exemplary illustrations of a first image 502 and a second image 504 having image segments in a form of concentric rings, in accordance with an embodiment of the present disclosure. In the first image 502, at least one image segment comprises a plurality of image segments (depicted as white image segments 502A) and a plurality of remaining image segments (depicted as black image segments 502B), wherein the plurality of image segments and the plurality of remaining image segments are arranged in an interleaved manner. In the second image 504, at least one image segment comprises a plurality of image segments (depicted as black image segments 504A) and a plurality of remaining image segments (depicted as white image segments 504B), wherein the plurality of image segments and the plurality of remaining image segments are arranged in an interleaved manner. An image segment in the first image 502 has a corresponding image segment in the second image 504.

FIGS. 5A and 5B are merely examples, which should not unduly limit the scope of the claims herein. A person skilled in the art will recognize many variations, alternatives, and modifications of embodiments of the present disclosure.

Referring to FIGS. 6A and 6B, illustrated are exemplary illustrations of a given image 600 comprising a first image segment 602 and a second image segment 604, in accordance with different embodiments of the present disclosure. The given image 600 is any image which is captured by selectively illuminating a field of view of an image sensor (not shown).

For example, the given image 600 may be a first image and/or a second image. In FIGS. 6A and 6B, the second image segment 604 surrounds the first image segment 602. The first image segment 602 shown in FIG. 6A is symmetric about an axis O-O' passing through an optical centre X of the image sensor. The first image segment 602 shown in FIG. 6B is not symmetric.

FIGS. 6A and 6B are merely examples, which should not unduly limit the scope of the claims herein. A person skilled in the art will recognize many variations, alternatives, and modifications of embodiments of the present disclosure.

Referring to FIG. 7, illustrated are steps of a method for imaging incorporating error compensation in images captured using metalenses, in accordance with an embodiment of the present disclosure. The method is implemented by an imaging system comprising a controllable light source, an image sensor, and a metalens that is to be employed to focus incoming light onto the image sensor. At step 702, the controllable light source is controlled to illuminate a given part of a field of view (FOV) of the image sensor at a first time instant, whilst the image sensor is controlled to capture a first image. At least one image segment of the first image represents the given part of the field of view as being illuminated, and at least one remaining image segment of the first image represents a remaining part of the field of view as being non-illuminated. At step 704, the controllable light source is controlled to illuminate the remaining part of the field of view of the image sensor at a second time instant, whilst the image sensor is controlled to capture a second image. At least one image segment of the second image represents the given part of the field of view as being non-illuminated, and at least one remaining image segment of the second image represents the remaining part of the field of view as being illuminated. At step 706, an output image is generated based on at least one of: (i) the at least one image segment of the first image and the at least one remaining image segment of the second image, (ii) the at least one remaining image segment of the first image and the at least one image segment of the second image. The aforementioned steps are only illustrative and other alternatives can also be provided where one or more steps are added, one or more steps are removed, or one or more steps are provided in a different sequence without departing from the scope of the claims herein.

The invention claimed is:

1. An imaging system comprising:
 a controllable light source;
 an image sensor;
 a metalens that is to be employed to focus incoming light onto the image sensor; and at least one processor configured to:
control the controllable light source to illuminate a given part of a field of view of the image sensor at a first time instant, whilst controlling the image sensor to capture a first image, wherein at least one image segment of the first image represents the given part of the field of view as being illuminated, and at least one remaining image segment of the first image represents a remaining part of the field of view as being non-illuminated;
control the controllable light source to illuminate the remaining part of the field of view of the image sensor at a second time instant, whilst controlling the image sensor to capture a second image, wherein at least one image segment of the second image represents the given part of the field of view as being non-illuminated, and at least one remaining image segment of the second image represents the remaining part of the field of view as being illuminated; and
generate an output image based on at least one of:
(i) the at least one image segment of the first image and the at least one remaining image segment of the second image,
(ii) the at least one remaining image segment of the first image and the at least one image segment of the second image.

2. The imaging system of claim 1, wherein the output image is generated by combining the at least one image segment of the first image and the at least one remaining image segment of the second image.

3. The imaging system of claim 1, wherein when generating the output image, the at least one processor is configured to:
subtract pixel values of pixels in the at least one image segment of the second image from pixel values of corresponding pixels in the at least one image segment of the first image, to generate at least one image segment of the output image;
subtract pixel values of pixels in the at least one remaining image segment of the first image from pixel values of corresponding pixels in the at least one remaining image segment of the second image, to generate at least one remaining image segment of the output image; and
combine the at least one image segment of the output image with the at least one remaining image segment of the output image, to generate the output image.

4. The imaging system of claim 1, wherein when generating the output image, the at least one processor is configured to:
control the controllable light source to illuminate an entirety of the field of view of the image sensor at a third time instant, whilst controlling the image sensor to capture a third image;
subtract pixel values of pixels in the at least one image segment of the second image from pixel values of corresponding pixels in at least one image segment of the third image, to generate at least one image segment of the output image;
subtract pixel values of pixels in the at least one remaining image segment of the first image from pixel values of corresponding pixels in at least one remaining image segment of the third image, to generate at least one remaining image segment of the output image; and
combine the at least one image segment of the output image with the at least one remaining image segment of the output image, to generate the output image.

5. The imaging system of claim 1, wherein the at least one processor is configured to:
control the controllable light source to illuminate an entirety of the field of view of the image sensor at a plurality of time instants, whilst controlling the image sensor to capture a plurality of images;
subtract pixel values of pixels in the output image from pixel values of corresponding pixels in one of the plurality of images, to generate delta pixel values of the pixels; and
subtract the delta pixel values of the pixels from pixel values of corresponding pixels in respective ones of the plurality of images, to generate corresponding output images.

6. The imaging system of claim 1, wherein the at least one image segment comprises a plurality of image segments, and the at least one remaining image segment comprises a plurality of remaining image segments, wherein the plurality of image segments and the plurality of remaining image segments are arranged in an interleaved manner.

7. The imaging system of claim 6, wherein the image sensor is a time-of-flight sensor, the output image being a phase image, the plurality of image segments and the plurality of remaining image segments being in a form of stripes,
wherein the at least one processor is configured to:
process a plurality of phase images to generate a depth map;
process amplitude data in at least one of the plurality of phase images to generate an additional depth map; and
employ the additional depth map for reducing error in the depth map generated from the plurality of phase images.

8. The imaging system of claim 6, wherein the plurality of image segments and the plurality of remaining image segments are in a form of concentric rings.

9. The imaging system of claim 1, wherein the at least one image segment comprises a first image segment, and the at least one remaining image segment comprises a second image segment that surrounds the first image segment.

10. The imaging system of claim 9, wherein the first image segment is symmetric about an axis passing through an optical centre of the image sensor.

11. The imaging system of claim 9, wherein the first image segment is not symmetric.

12. A method for imaging, the method being implemented by an imaging system comprising a controllable light source, an image sensor, and a metalens that is to be employed to focus incoming light onto the image sensor, the method comprising:
controlling the controllable light source to illuminate a given part of a field of view of the image sensor at a first time instant, whilst controlling the image sensor to capture a first image, wherein at least one image segment of the first image represents the given part of the field of view as being illuminated, and at least one remaining image segment of the first image represents a remaining part of the field of view as being non-illuminated;
controlling the controllable light source to illuminate the remaining part of the field of view of the image sensor at a second time instant, whilst controlling the image sensor to capture a second image, wherein at least one image segment of the second image represents the given part of the field of view as being non-illuminated, and at least one remaining image segment of the second image represents the remaining part of the field of view as being illuminated; and generating an output image based on at least one of:
(i) the at least one image segment of the first image and the at least one remaining image segment of the second image,
(ii) the at least one remaining image segment of the first image and the at least one image segment of the second image.

13. The method of claim 12, wherein the step of generating the output image comprises combining the at least one image segment of the first image and the at least one remaining image segment of the second image.

14. The method of claim 12, wherein the step of generating the output image comprises:
subtracting pixel values of pixels in the at least one image segment of the second image from pixel values of corresponding pixels in the at least one image segment of the first image, for generating at least one image segment of the output image;
subtracting pixel values of pixels in the at least one remaining image segment of the first image from pixel values of corresponding pixels in the at least one remaining image segment of the second image, for generating at least one remaining image segment of the output image; and
combining the at least one image segment of the output image with the at least one remaining image segment of the output image, for generating the output image.

15. The method of claim 12, wherein the step of generating the output image comprises:
controlling the controllable light source to illuminate an entirety of the field of view of the image sensor at a third time instant, whilst controlling the image sensor to capture a third image;
subtracting pixel values of pixels in the at least one image segment of the second image from pixel values of corresponding pixels in at least one image segment of the third image, for generating at least one image segment of the output image;
subtracting pixel values of pixels in the at least one remaining image segment of the first image from pixel values of corresponding pixels in at least one remaining image segment of the third image, for generating at least one remaining image segment of the output image; and
combining the at least one image segment of the output image with the at least one remaining image segment of the output image, for generating the output image.

16. The method of claim 12, further comprising:
controlling the controllable light source to illuminate an entirety of the field of view of the image sensor at a plurality of time instants, whilst controlling the image sensor to capture a plurality of images;
subtracting pixel values of pixels in the output image from pixel values of corresponding pixels in one of the plurality of images, for generating delta pixel values of the pixels; and
subtracting the delta pixel values of the pixels from pixel values of corresponding pixels in respective ones of the plurality of images, for generating corresponding output images.

17. The method of claim 12, wherein the at least one image segment comprises a plurality of image segments, and the at least one remaining image segment comprises a plurality of remaining image segments, wherein the plurality of image segments and the plurality of remaining image segments are arranged in an interleaved manner.

18. The method of claim 17, wherein the image sensor is a time-of-flight sensor, the output image being a phase image, the plurality of image segments and the plurality of remaining image segments being in a form of stripes, wherein the method further comprises:
processing a plurality of phase images for generating a depth map;
processing amplitude data in at least one of the plurality of phase images for generating an additional depth map; and
employing the additional depth map for reducing error in the depth map generated from the plurality of phase images.

19. The method of claim 17, wherein the plurality of image segments and the plurality of remaining image segments are in a form of concentric rings.

20. The method of claim 12, wherein the at least one image segment comprises a first image segment, and the at least one remaining image segment comprises a second image segment that surrounds the first image segment.

21. The method of claim 20, wherein the first image segment is symmetric about an axis passing through an optical centre of the image sensor.

22. The method of claim 20, wherein the first image segment is not symmetric.

* * * * *